United States Patent [19]

Sawada

[11] Patent Number: 5,099,162
[45] Date of Patent: Mar. 24, 1992

[54] COIL OF SUPERCONDUCTING MATERIAL FOR ELECTRIC APPLIANCE AND MOTOR UTILIZING SAID COIL

[75] Inventor: Takeshi Sawada, Yamato, Japan

[73] Assignee: Canon Kabushiki Kaisha, Tokyo, Japan

[21] Appl. No.: 220,162

[22] Filed: Jul. 18, 1988

[30] Foreign Application Priority Data

Jul. 22, 1987 [JP] Japan .................... 62-184399
Apr. 4, 1988 [JP] Japan .................... 63-81397

[51] Int. Cl.$^5$ .................................. H02K 1/00
[52] U.S. Cl. ............................ 310/198; 310/52; 310/154; 310/156; 310/184; 310/208; 310/254; 310/268; 505/1; 505/706
[58] Field of Search ............ 310/10, 184, 40 R, 165, 310/40 MM, 52, 268, 198, 201, 206, 205, 179, 180, 208, 68 R, 194, 156, 269, 154, 254, 261, 233, 248; 335/216; 336/DIG. 1; 505/1, 705, 706, 710, 717, 727

[56] References Cited

U.S. PATENT DOCUMENTS

| 3,242,418 | 3/1966 | Mela | 310/40 R |
|---|---|---|---|
| 3,405,290 | 10/1968 | Halas | 310/268 |
| 3,440,456 | 4/1969 | Grunwald | 310/52 |
| 3,466,483 | 9/1969 | Johnson | 310/268 |
| 3,521,091 | 7/1970 | Halas | 310/40 R |
| 3,761,752 | 9/1973 | Anderson | 310/194 |
| 3,999,091 | 12/1976 | Kirtley, Jr. | 310/40 R |
| 4,327,304 | 4/1982 | Aoki | 310/198 |
| 4,794,293 | 12/1988 | Fujisaki | 310/268 |
| 4,823,033 | 4/1989 | Fujiwara | 310/40 MM |

FOREIGN PATENT DOCUMENTS

| 0186940 | 11/1982 | Japan . |
|---|---|---|
| 0186941 | 11/1982 | Japan . |
| 0186942 | 11/1982 | Japan . |
| 62-27704 | 12/1987 | Japan . |
| 63-72569 | 5/1988 | Japan . |
| 63-113377 | 5/1988 | Japan . |

OTHER PUBLICATIONS

High $T_c$ Superconductors–Composite Wire and Coil Fabrication; 4/13/1987; S. Tin et al.; AT&T Bell Lab's; Murray Hill, N.J.

Primary Examiner—R. Skudy
Attorney, Agent, or Firm—Fitzpatrick, Cella, Harper & Scinto

[57] ABSTRACT

Coils for electric appliances such as motor or generator are made with a superconducting material, and the width of the coil and the gap between the coils are so adjusted that the passage of magnetic flux generated by a magnetic flux generating member in the electric appliance is not influenced by the magnetic repulsion of the superconducting material.

9 Claims, 8 Drawing Sheets

WIDTH OF CONDUCTIVE WIRE

COIL OF SUPERCONDUCTING MATERIAL FOR ELECTRIC APPLIANCE AND MOTOR UTILIZING SAID COIL

BACKGROUND OF THE INVENTION

1. Field of the Invention

The present invention relates to an improvement on a motor and/or a generator, and more particularly to the reduction of loss in current in the coils by utilizing a superconducting material in the coils of a motor or a generator.

2. Related Background Art

Motors are employed in rotating parts of VTR's, still video equipments etc. Requirements for the motors are a uniform torque, compactization, improvement in maximum torque, improvement in torque-to-revolution characteristics etc.

For compactization of the motor, the Japanese Laid-Open Patents 57-186940, 57-186941 and 57-186942 disclose a motor coil of printed structure, obtained by etching a copper plate on an insulating substrate, instead of conventional coil composed of a conductor wound on an iron core.

The coil disclosed in the above-mentioned patent references is made very thin by etching the conductor constituting the coil (hereinafter called printed coil), and can provide a flat and compact motor. FIG. 1 shows an example of use of a motor with printed coils in a video cassette recorder.

In FIG. 1, coils 1, 1' formed on a substrate are fixed, through a fixed yoke 5', to a lower drum 6. When said coils, with a current therein, cross the magnetic flux from a magnet 4, a torque is obtained in a rotor equipped with said magnet. A yoke 5 of a magnetic material is provided for preventing the spreading of said magnetic flux and improving the efficiency. Said yoke is connected to an upper drum 3 through a rotary shaft 2 and functions as a rotor. The upper drum is equipped with magnetic heads 7, 7' for magnetoelectrical conversion, and a rotary transformer 8 is mounted on the upper and lower drums for transmitting the signals to or from said magnetic heads. In FIG. 1, the coil motor corresponds to a portion sandwiched between the yokes 5, 5'.

FIG. 3 shows the coil pattern of said motor. The pattern 10 is formed by etching a copper layer of about 100 microns in thickness adhered to a coil substrate 9. The coils thus prepared are superposed in plural layers, such as three or six layers, to obtain a coil unit. The width of coil wiring is represented by W, and the width of groove for forming the coil pattern is represented by $\Delta W$. The value of $\Delta W$ should be made as small as possible in order to improve the motor efficiency by reducing the resistance of coils. In an example $\Delta W=80$ $\mu$m while W=ca. 400 $\mu$m, so that $\Delta W/W \leq 0.2$. The groove width $\Delta W$ is principally determined by the thickness of copper, while W is determined by the number of turns in a spiral coil and the magnitude of inverse electromotive force.

In recent years there has been remarkable progress in the superconducting transition temperature Tc of superconducting ceramics. Already in the ceramics of Y-Sc-Ba-Sr-Cu-M-O (M=metal) family, the superconducting state has been observed from an ultra low temperature state to a high temperature state. This material is applicable to a coil motor, and can achieve a maximum efficiency, utilizing the zero resistance. In fact the zero resistance in the current path drastically improves the resolution-torque characteristic, and provides a several times higher ability for maintaining a constant revolution.

However, the formation of coils with a superconducting material has resulted in various drawbacks which will be explained in the following in relation to FIG. 2, which is a circumferential cross-sectional view, in the vicinity of the center, of the coils shown in FIG. 3 and shows the shape parallel to the direction of rotation. There are shown a permanent magnet 4 magnetized in a direction indicated by an arrow; magnetic yokes 5, 5'; a coil substrate 9; and coil wires 10 perpendicular to the direction of current 11 indicates magnetic flux, while 12 is a symbol indicating the direction of current, and 13 is the groove of a width $\Delta W$.

Firstly, though it has been tried to reduce the width $\Delta W$ of the groove, the magnetic flux is concentrated in the grooves 13 because of the perfect diamagnetism of the superconducting material, thus causing increase in the magnetic resistance of the magnet 4 and the yoke 5', decrease of magnetic flux, larger spreading thereof, and eventually decrease of the torque.

Secondly, the increase of the dimension of the current path increases the inductance, thus increasing the inverse electromotive force and giving a large load to the driving circuits The above-mentioned drawbacks are not limited to a motor but are also encountered in a generator.

FIG. 4 shows a cylindrical coreless motor, of which coils are formed by winding a conductor in cylindrical shape as disclosed in the U.S. Pat. No. 4,327,304.

FIG. 5 is a partial cross-sectional view of the motor shown in FIG. 4. The magnetic flux emerging from the N-pole of a permanent magnet 12 crosses conductors 14, then passes through an external core 16 of a soft magnetic material, again crosses the conductors 14 and reaches the S-pole of the permanent magnet 12. A rotor 22 rotates in a direction 20 by appropriately regulating the direction 18 of the current in the conductors according to the direction of the magnetic flux.

A superconducting material, if employed in the coils of the cylindrical motor as shown in FIG. 4, leads to following drawbacks.

Because of the Meissner effect of the conductors made of the superconducting material, the magnetic flux 26 is unable to penetrate the conductors and assumes a distribution as shown in FIG. 6. As the magnetic flux has to go around the conductors 24, the length of the magnetic flux becomes longer, and the paths of the magnetic flux become narrower. Consequently the cross section of the magnetic flux is reduced to increase the reluctance, thus decreasing the amount of magnetic flux. In this manner the improvement in the efficiency obtained by the use of superconducting material, capable of reducing the resistance of conductors to zero, is eventually cancelled.

SUMMARY OF THE INVENTION

A first object of the present invention is to provide a coil structure for use in an electric equipment involving electromagnetic effect such as motor or generator, capable of preventing the influence of perfect diamagnetism caused by Meissner effect which is encountered when a superconducting material is employed in the coil.

In order to achieve said first object, there are proposed coil structures of planar type and cylindrical type.

A second object of the present invention is to provide a coil made of a superconducting material, formed as a spiral shape and having a suitable relationship between the width of conductor and the gap of conductors for enabling the magnetic flux from the magnetic flux generating means to pass through the spacing between the conductors thereby effectively utilizing the characteristics of the superconducting material, and a motor utilizing such coils.

A third object of the present invention is to provide a cylindrical coil for a cylindrical motor, capable of preventing the influence caused by Meissner effect in case a superconducting material is used for said coil, and a motor utilizing said coils.

BRIEF DESCRIPTION OF THE DRAWINGS

FIGS. 1 to 5 illustrate prior arts wherein;
FIG. 1 is a schematic view of a flat motor;
FIG. 2 is a schematic view of paths of magnetic flux;
FIG. 3 is a schematic view of conventional spiral coils;
FIG. 4 is a cross-sectional view of a cylindrical motor;
FIG. 5 is a schematic view of the working principle of a cylindrical motor;
FIGS. 7 to 10 illustrate coils of the present invention applied to a flat motor; wherein
FIG. 7 is a schematic view of spiral coils formed on a substrate 28;
FIG. 10 is a view of an improvement over the spiral coils shown in FIG. 7;
FIGS. 11 to 17 illustrate coils of the present invention applied to a cylindrical motor, wherein
FIG. 11 is a schematic view of a cylindrical motor structure utilizing thin film coils of a superconducting material;
FIG. 13 is a schematic view of a coil of another structure;
FIGS. 14, 15 and 16 are views of variations of the coil structure;
and
FIG. 17 is a view of a cylindrical motor of another structure.

DESCRIPTION OF THE PREFERRED EMBODIMENTS

At first reference is made to FIGS. 7 to 10 for explaining the structure of coils and motor suitable for a flat motor.

Figure 7:
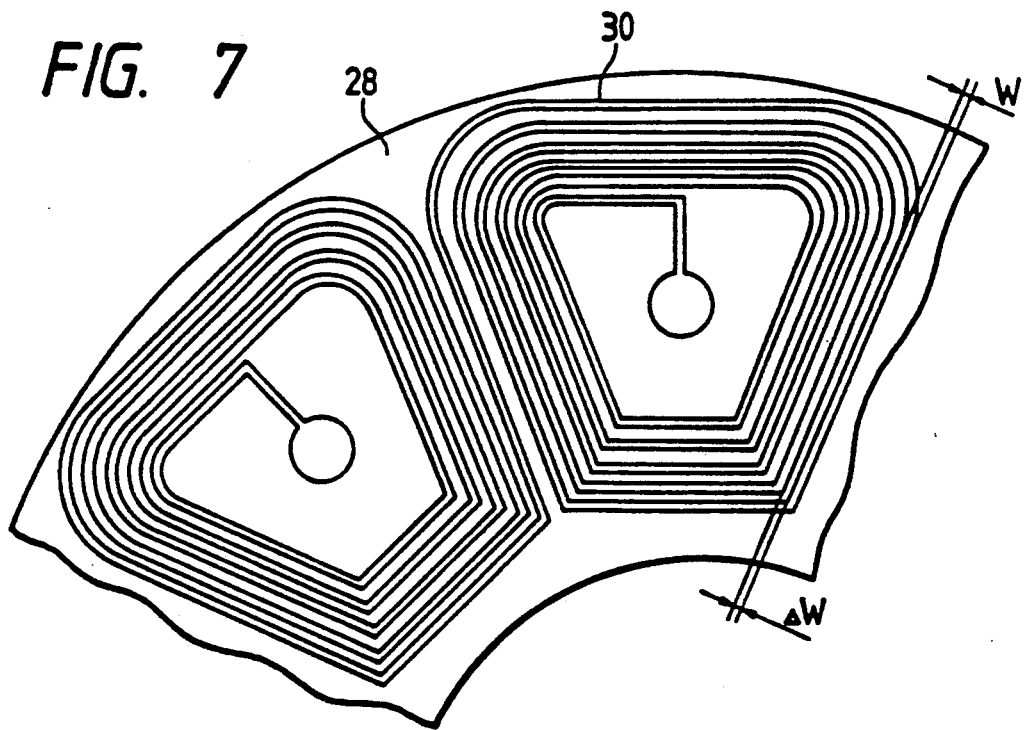

FIG. 7 shows a first embodiment of the coils, best representing the features of the present invention, wherein illustrated are a coil substrate 28 and coil patterns 30 of a superconducting material.

The width W of the coil conductor is selected smaller than the gap $\Delta W$ of the groove The coils are prepared in the following manner. At first a silicon wafer of 0.2 mm in thickness is subjected to an insulating treatment by oxidation, as the coil substrate. Then a ceramic thin film of Y-Ba-Cu-O or Y-Sc-Ba-Sr-Cu-Mn-O family is deposited in a thickness of 20 to 50 $\mu$m by CVD (chemical vapor deposition), sputtering or electron beam deposition. Subsequently photoresist is coated thereon, subjected to exposure of coil patterns with an exposure apparatus, and is left only in the necessary portions. Then the patterns of superconducting material are left by dry etching such as ion milling, and the coils are completed by removing the remaining photoresist. The coil pattern formation need not necessarily be achieved by dry etching, but can be more efficiently conducted by wet etching with nitric-phosphoric mixed acid if the precision of patterns has enough margin. In this manner there can be obtained spiral coil patterns as shown in FIG. 7.

Figure 8A:
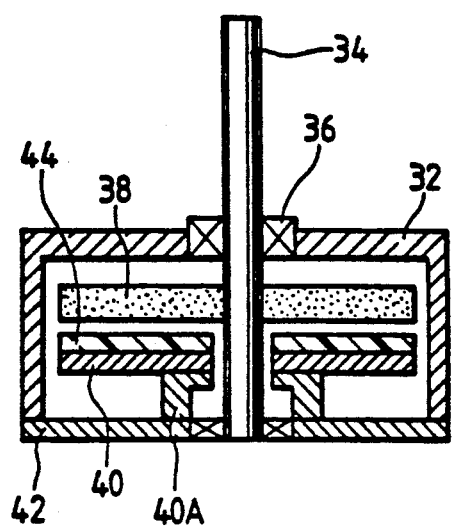
FIG. 8A is a schematic view of a motor with fixed coils.
Figure 8B:
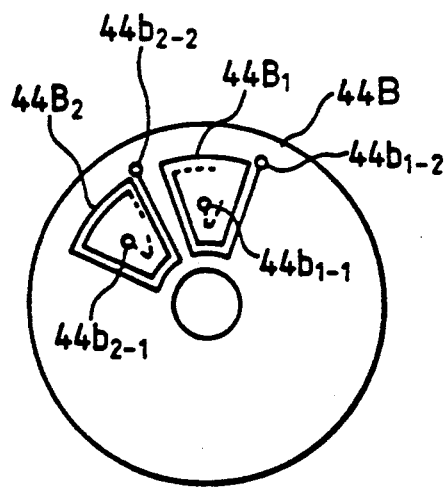
FIG. 8B is a schematic view of a motor with fixed coils.

The dimensions of the coil shown in FIG. 7 are determined according to design specifications of the electric apparatus in which the coils of the present invention are to be employed. As an example, in case of a motor, the width W of the conductors constituting current paths in the radial direction of the coils is selected as 100 $\mu$m, and the width $\Delta W$ of the gaps between said conductors is selected as 400 $\mu$m. In case the coils of the structure shown in FIG. 7 are employed in a flat motor in which the coils are opposed to the permanent magnet in planar manner, said coils may be designed rotative or fixed. FIGS. 8A and 8B show an example of non-rotating coils. There are shown a motor case 32; a rotary shaft 34 rotatably supported by the motor case 32 through a bearing 36; a rotor magnet 38 which is a permanent magnet fixed on the rotary shaft 34; a yoke member 40 fixed to a motor bracket 42 by means of a support member 40A; and coils 44 fixed on the yoke 40.

The coils 44 are composed of a coil substrate 44B (FIG. 8B) on which spiral coil patterns $44B_1$, $44B_2$, ... are formed. The internal ends $44b_{1-1}$, $44b_{2-1}$, ... of the coil patterns on the coil substrate 44A and the external ends $44b_{2-1}$, $44b_{2-2}$, ... are connected according to the known connecting methods of the motor coils.

The spiral coil patterns $44B_1$, $44B_2$, ... of the superconducting ceramic material are formed on the coil substrate 44A shown in FIG. 8A, according to a method similar to that explained before in relation to FIG. 7.

The coil patterns $44B_1$, $44B_2$, ... are formed in a desired number, concentrically with the rotary shaft 34, according to the design specification of the motor.

The motor shown in FIGS. 8A and 8B have non-rotating coils 44, so that the current supply to each coil pattern is controlled by detecting the position of poles of the permanent magnet 38 with a sensor.

Figure 9A:
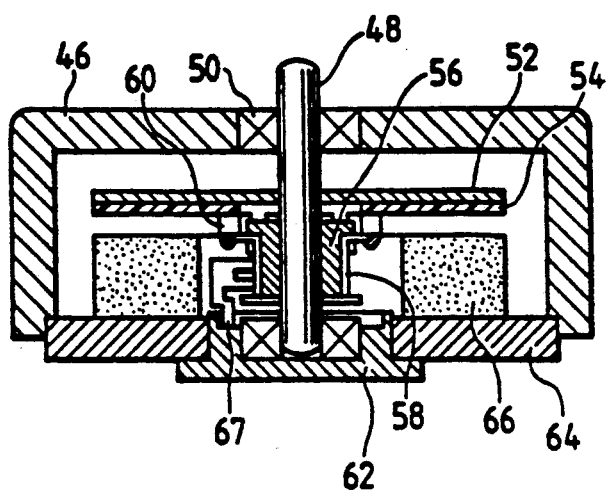
FIGS. 9A and 9B are schematic view of a motor with rotary coils.
Figure 9B:
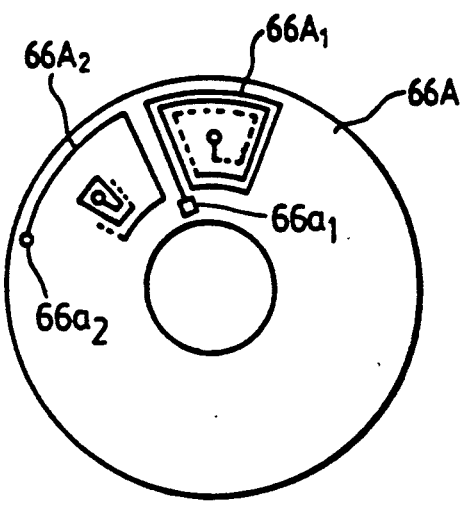

FIGS. 9A and 9B illustrate a motor in which the coils of superconducting material rotate together with the rotary shaft.

There are shown a motor case 46; a rotary shaft 48 rotatably supported by a bearing 50; a support-substrate 52 fixed to the rotary shaft 48; coils 54 formed on the support substrate 52; a commutator support member 56 fixed on the rotary shaft 48; a commutator 58; and connection members 60 for connecting the commutator with said coils.

There are further shown a motor bracket 62; a stator yoke 64; a permanent magnet 66 fixed to the stator yoke and positioned opposite said coils 54; and brushes 67 mounted on the bracket 62 and maintained in contact with the commutator 58. FIG. 9B shows the substrate provided with spiral coil patterns.

The coil patterns of the motor with rotating coils shown in FIG. 9A are formed in spiral shape as shown in FIG. 7, and, for achieving current supply to said coils in Y-connection, the internal ends of the coil patterns and the external ends thereof are mutually connected according to the known connecting method.

The spiral coil patterns $66A_1$, $66A_2$, . . . are formed with a superconducting ceramic material on the coil substrate 66A shown in FIG. 9B, in a similar manner as explained before in relation to FIG. 7. The number of the coil patterns $66A_1$, . . . is determined according to the motor design. The coils are concentrically positioned on a plane extending in the radial direction of the rotary shaft and paths for magnetic flux are formed between adjacent concentrically positioned turns of the coils.

An end $66a_1$ of the coil pattern $66A_1$ and an end $66a_2$ of the coil pattern $66A_2$ are connected to the commutator, and a connecting circuit pattern not shown is connected to an unrepresented common wiring. The superconducting materials employed in the present invention have been tested in various compositions for determining the temperature conditions realizing the superconducting state, and there have been announced certain compositions capable of showing the superconducting state at temperatures considerably higher than the absolute zero temperature. However there has not been found a superconducting material that will allow to use the motor of the present invention at the temperature of normal ambient condition. It is therefore necessary to cool the coils and/or motor of the present invention. In case of the flat motor shown in FIG. 8A and the cooling is achieved by inserting a Peltier element (not shown) between the fixed yoke 40 and the coils 44.

Figure 1:
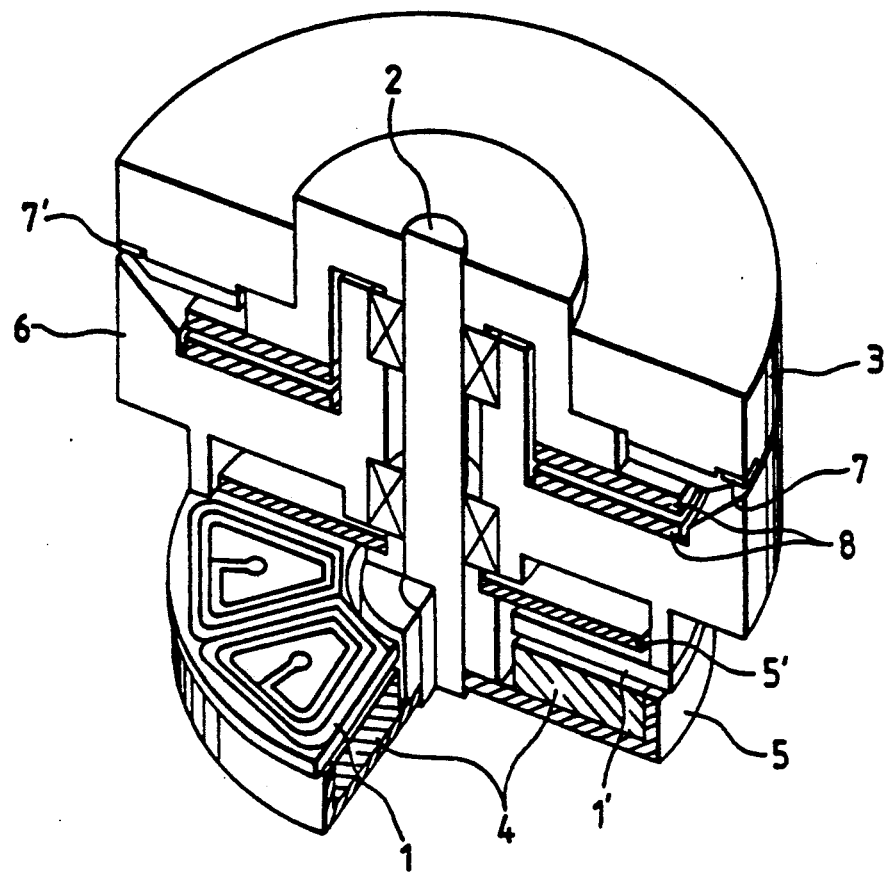
Figure 2:
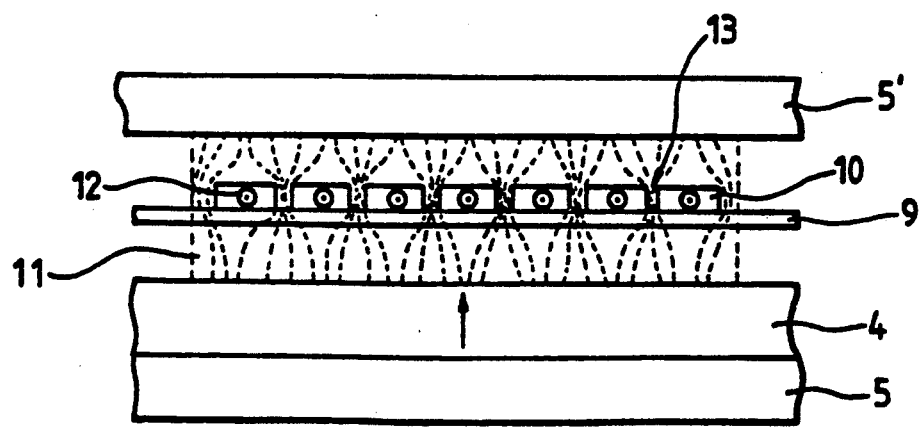
Figure 3:
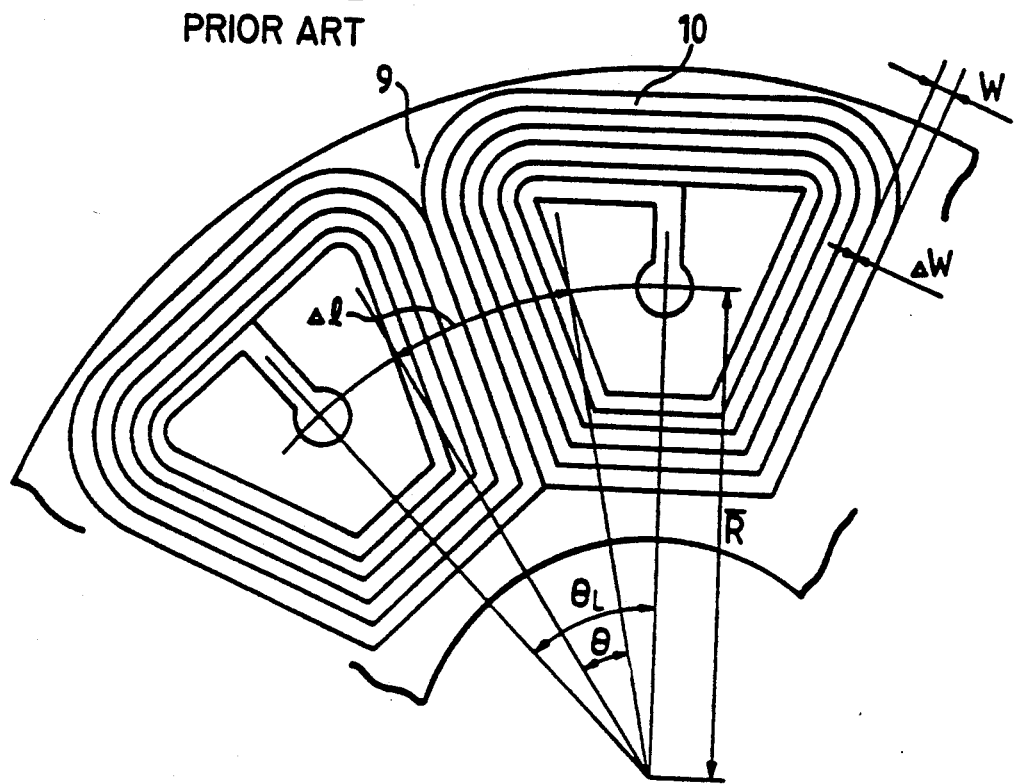
Figure 4:
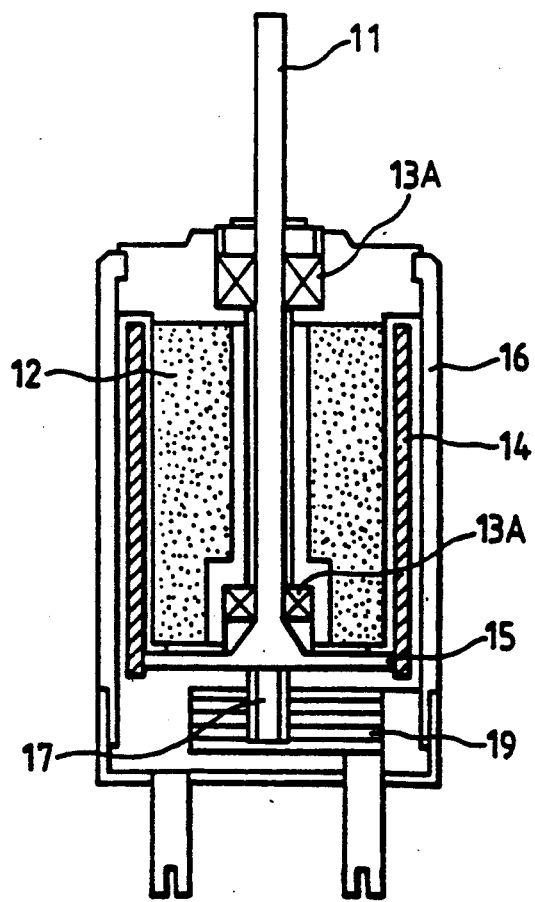
Figure 5:
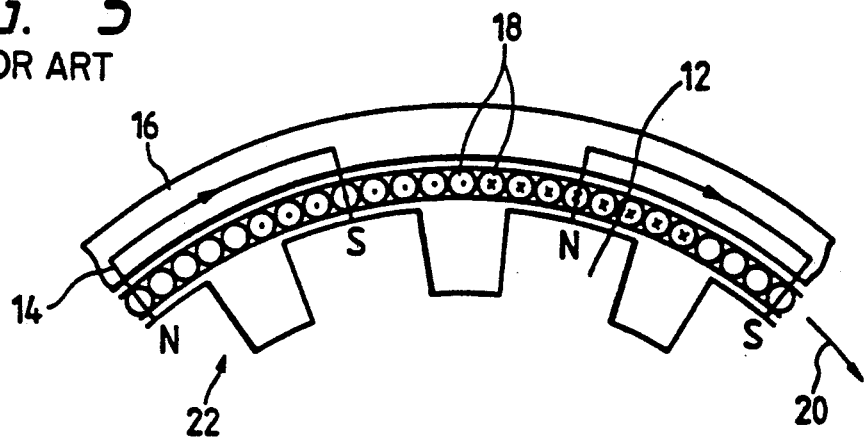
Figure 6:
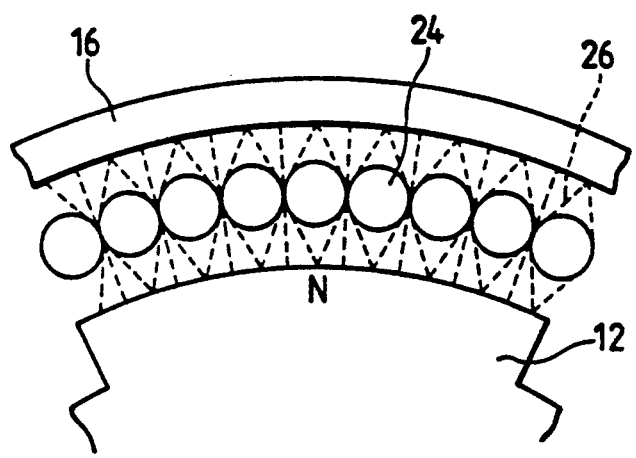
FIG. 6 is a schematic view of paths of magnetic flux in case coils 24 are made of a superconducting material.

In case of the motor shown in FIG. 4, the Peltier element not shown is attached to the core 16. It is also possible to supply the coils in the motor with liquid nitrogen.

The motor of the present invention utilizing the coils of a superconducting material provides following advantages:

(1) The area of the conductors showing perfect diamagnetism is reduced, thus reducing the loss in the amount of magnetic flux emerging from the magnet, thus avoiding the loss in torque and efficiency:

(2) The inductance is reduced in comparison with the wider current paths, thus reducing the load on the driving circuit:

(3) A more compact motor structure is made possible by the improved efficiency:

(4) The use of narrower current paths reduces the fetching of the magnetic flux and the loss caused by the movement thereof, observed in the superconducting material of the second kind, thereby enabling to reduce the power consumption; and (5) The use of narrower current paths allows to increase the limit current density in the superconducting material.

Figure 10:
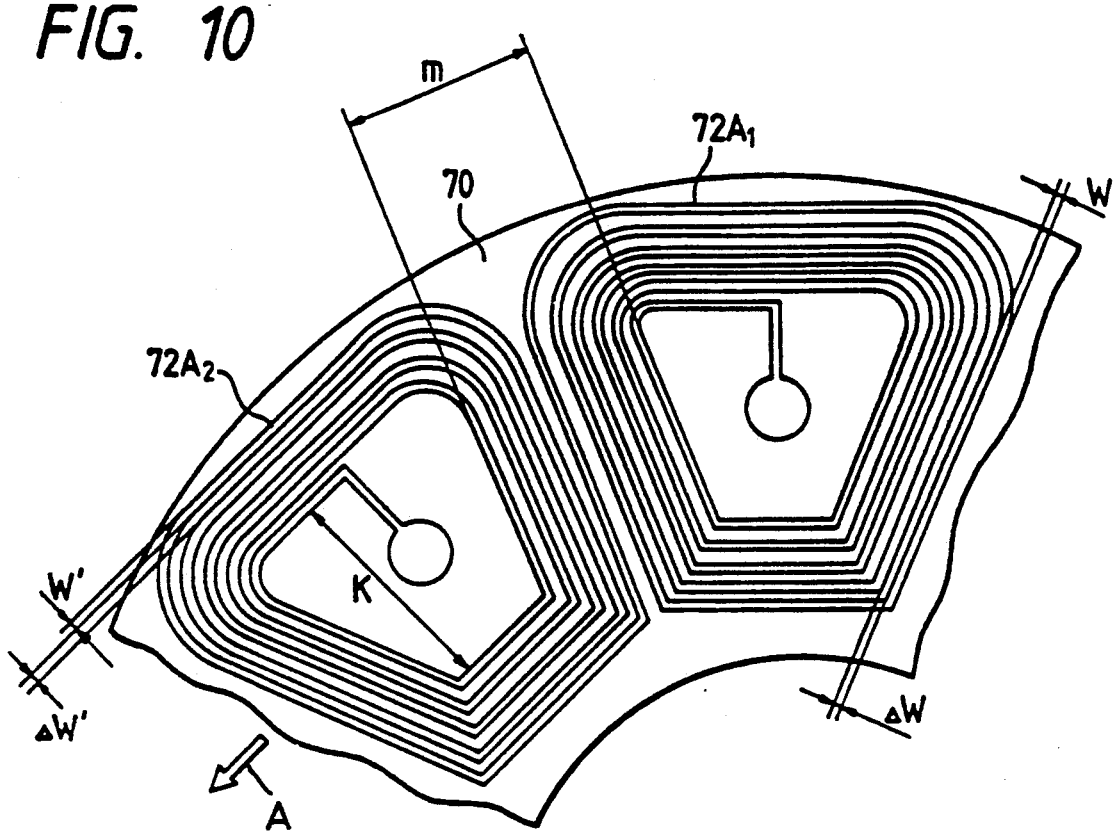

FIG. 10 shows an improvement on the spiral coils shown in FIGS. 7, 9A and 9B, wherein a substrate 70 supports spiral coils $72A_1$, $72A_2$, . . . of a superconducting material, and an arrow a indicates the rotating direction of the coils. A symbol k indicates the length of space of the coil (length of area of the effective magnetic flux), and m indicates the width of uniform magnetization of the permanent magnet.

In the present embodiment the ratio $\Delta W/W$ is selected equal to or smaller than 1 in the current paths running perpendicular to the rotating direction A, but the width $\Delta W'$ of the grooves is made as small as possible in the current paths (width $W'$) running parallel to the rotating direction. In the present embodiment, following values $W=W'=400$ $\mu$m, $\Delta W=400$ $\mu$m and $\Delta W'=100$ $\mu$m are selected. Thus the value k increase by the narrowing of the current paths, and the torque increases by the interaction with the magnetic flux density. More specifically, the relation among the torque T, current i and magnetic flux density B is represented by:

$$T \propto k \cdot B \cdot i$$

so that the torque increase in proportion to the increase of k.

FIGS. 11 to 17 illustrate coils of a superconducting material, adapted for use in a cylindrical motor as shown in FIG. 4.

Figure 11:
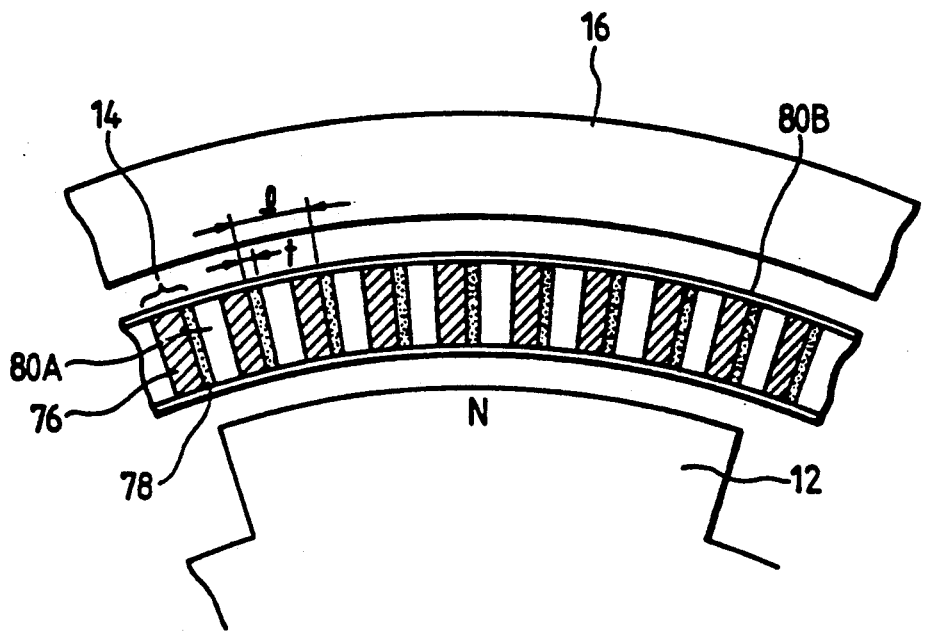
Figure 12A:
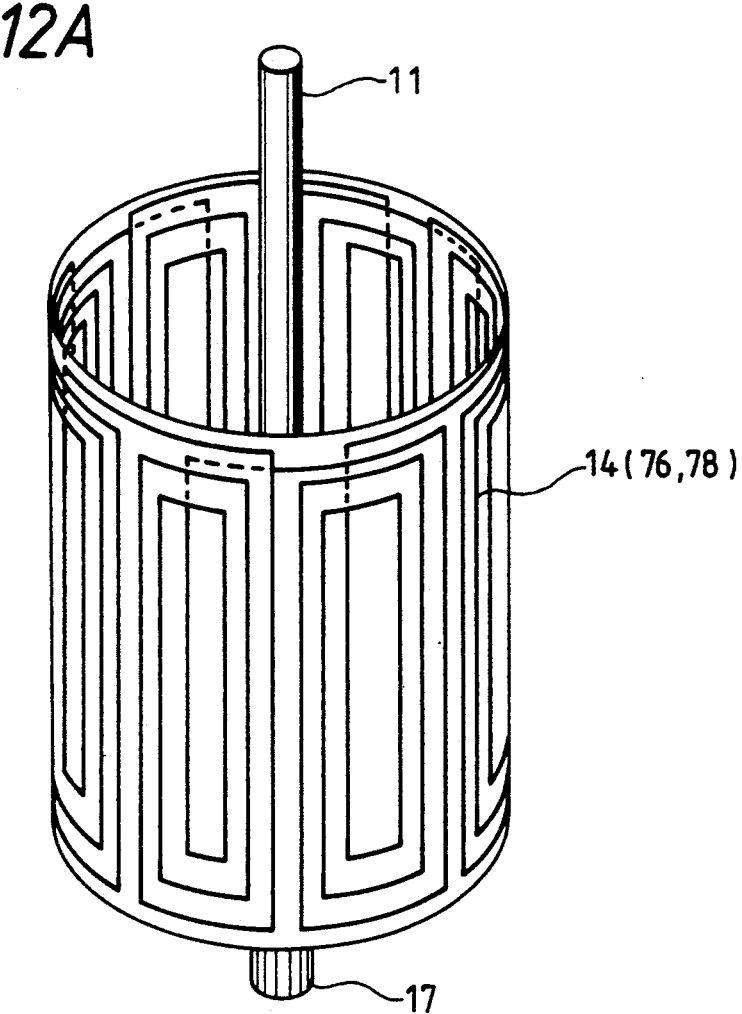
FIGS. 12A and 12B are schematic views of coil structure.
Figure 12B:
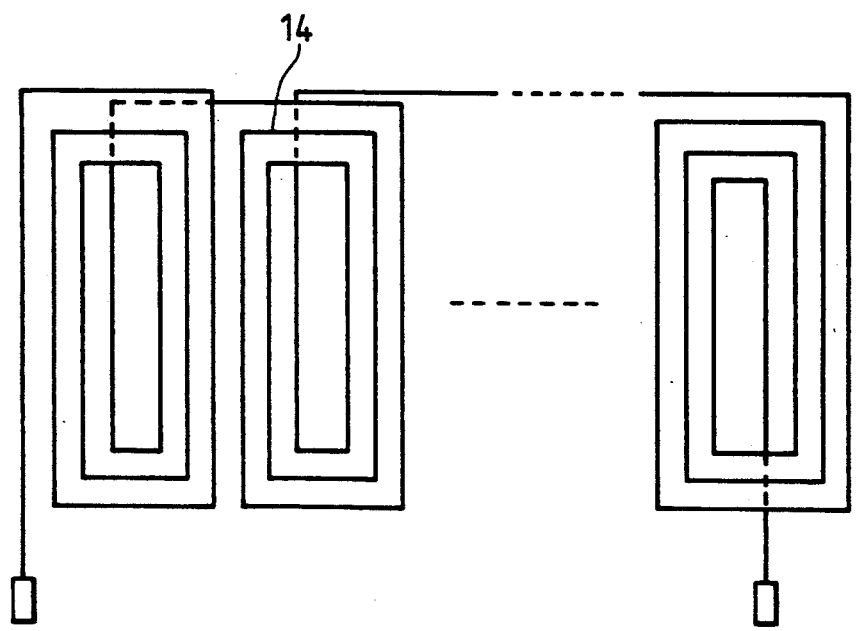

FIG. 11 is a partial cross-sectional view of the rotor of the present embodiment, wherein same components as those in FIG. 4 are represented by same numbers and will not be explained further. FIGS. 12A and 12B are respectively an external perspective view and a developed view of the rotor shown in FIG. 11

In these drawings, a conductor 14 constituting the coil wire is composed of a metal conductor 76 such as Cu or Al, and a superconducting thin film 78 formed on a face of said metal conductor 76 and composed of one or plural layers of a ceramic material containing rate earth metals or transition metals such as Bi-La-Sr-Cu-O, Y-Ba-Cu-O or La-Ba-Cu-O or a superconducting alloy. Thus, a coil of superconducting material is fixed on a plane of a metal sheet. In addition, the coil of superconducting material is composed of a first metal and is surfacially covered with the second metal. Said superconducting thin film 78 is formed by resistance-heated evaporation, electron beam evaporation, sputtering, electroplating or CVD, and the portions of the metal conductor 76 not provided with the thin film 78 are covered with a masking material or a susceptor to prevent the deposition of the thin film 78.

The coil patterns are determined by thus formed conductor 14, as shown in a developed view in FIG. 12B, and are fixed by filling the gaps of conductors with an insulating adhesive material 80A. Both faces of the coil patterns are then covered with resin 80B. A cylindrical rotor is formed by the coil patterns prepared in this manner.

In the above-explained structure, the conductors 14 are so arranged that the face of the superconducting thin film 78 is substantially parallel to the direction of magnetic flux passing through the rotor as shown in FIG. 11. Consequently the path of magnetic flux is scarcely distorted by the Meissner effect of the superconducting thin film, and the increase of reluctance can be prevented. Therefore the zero resistance in the coils obtained by the use of a superconducting material in the coils of a coreless motor can be directly reflected in the improvement of efficiency.

Also the use of a metal such as Cu or Al in the conductor 76 enables current supply in the coils even when the superconductive thin film 78 is in the normal conducting state, thus enabling rotor rotation in such state. Therefore, in case of using the motor of the present embodiment under a temperature condition capable of realizing the superconducting state, it is rendered possible to maintain the motor in rotation until said temperature condition is reached, thereby preventing the freezing of the motor.

In addition, the metal conductor 76 functions as a current bypass if the superconducting state is locally broken, thereby preventing undesirable influence to the motor caused by a sudden increase in resistance. Thus, the coil of superconducting material constitutes a conductor for current in cooperation with a metal sheet or member while maintaining the conductivity therebetween.

Figure 13:
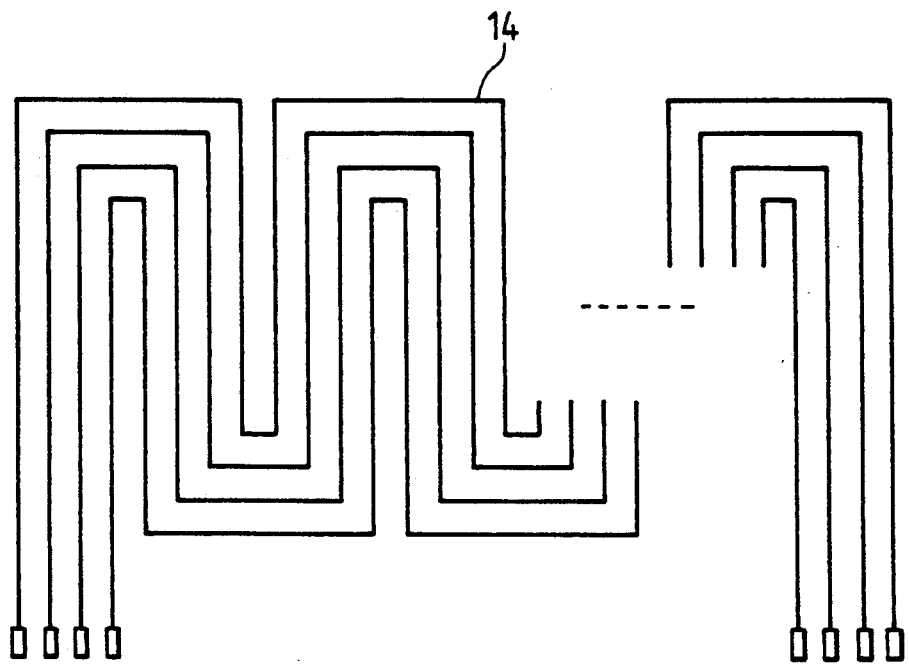

Besides, the thickness t of the superconducting thin film 78 is preferably as small as possible, but a certain thickness is inevitably required in consideration of the maximum necessary current. There is empirically required a relation $l > 2t$, wherein $l$ is the pitch of the conductors FIG. 13 shows another embodiment of the coil patterns, which are composed of plural conductors 14, in contrast to the pattern shown in FIG. 12B. This embodiment is advantageous in that the rotor can be made thinner, since the conductors do not cross each other. The number of wires or the number of turns shown in FIGS. 12 and 13 is just given as an example and is not limitative.

Figure 14:
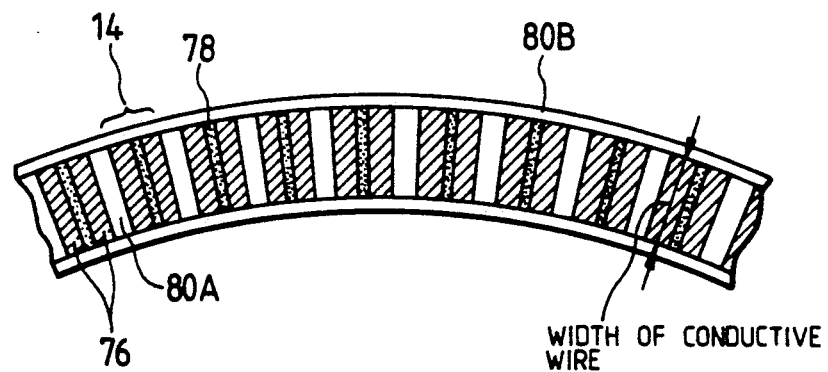

FIG. 14 is a horizontal cross-sectional view, similar to FIG. 11, showing another embodiment of the conductors. Different from the structure shown in FIG. 11, the superconducting thin film 78 is sandwiched between metal conductors 76. This structure can be realized for example as a clad material obtained by rolling.

The above-explained structure of the conductor 14 prevents the time-dependent change of the superconducting thin film 78 by the presence of covering conductors 76, thus improving the reliability of the conductor 14.

Also the above-explained structure is advantageous because the conductor can be manufactured for example by rooling, without destruction of the superconducting thin film.

Figure 15:
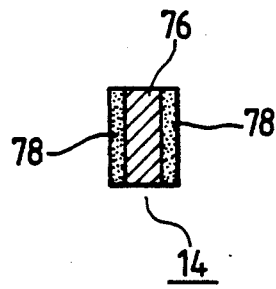
Figure 16:
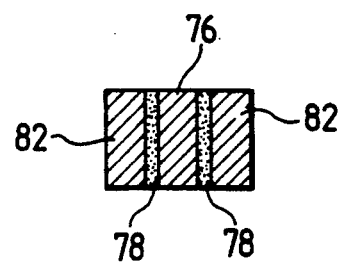

FIGS. 15 and 16 are transversal cross-sectional view of another embodiment of the conductor.

In the structure shown in FIG. 15, superconducting thin films 78 are deposited, for example by CVD, on both faces of a metal conductor 76.

In FIG. 16, the superconducting thin films 78 shown in FIG. 15 are protected by Cu plated layers 82.

Presence of two thin films 78 as shown in FIG. 15 or 16 provides a freedom in selecting the amount of current or the thickness of the thin films 78.

Figure 17:
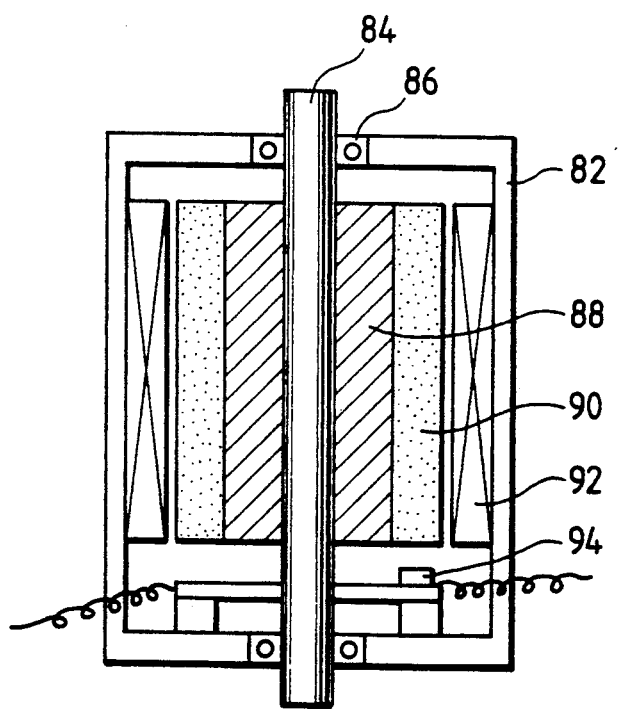

FIGS. 11 to 16 have illustrated coils adapted for use in a cylindrical motor with rotating coils as shown in FIG. 4. However the cylindrical motor can be provided with fixed coils and a rotating permanent magnet, as shown in FIG. 17. The coils of the present invention are also applicable to the motor with fixed coils. In FIG. 17, there are shown a motor case 82; a rotary shaft 84 supported by a bearing 86; a rotor yoke 88 fixed to the rotary shaft 84; a rotor magnet 90; and coils fixed on the internal periphery of the motor case. Said coils 92 are composed, as shown in FIGS. 11 to 16, of a metal conductor 76 and a superconducting thin film 78. In case of a motor with fixed coils shown in FIG. 17, a sensor 94 is provided for detecting the magnetic poles of a permanent magnet 90, for controlling the current supply to the coils.

The present invention has been explained by examples of motors, but similar advantages can be obtained when the coils of the present invention are applied to generators.

The advantages of the present invention explained in the foregoing can be summarized as follows:

to prevent loss in torque and efficiency, resulting from the use of superconducting material;

to reduce the inductance, thereby lowering the load of the driving circuit;

to achieve lighter weight and compactization;

to prevent loss in the current supply, resulting from the magnetic flux fetching of the superconducting material;

to increase the limit current density of the superconducting material; and to increase the torque by varying the groove pitch in the rotation direction and in the radial direction.

In addition, the motor can rotate even in the normal conducting state, and, even when the superconducting state is locally broken, it is possible to prevent rapid heat generation caused by the increase of resistance.

Also the conductors shown in the foregoing embodiments, if the superconducting thin film is positioned parallel to the path of the magnetic flux, can improve the performance of various electric appliances such as transformer, power accumulating inductor, coil etc.

What is claimed is:

1. A coil for use in electric equipment which comprises a rotary shaft to be rotated by current supplied to said coil; said coil being of a superconducting material and formed in a spiral shape and satisfying a relation $\Delta W > W$ wherein $W$ is the width of a conductor of said coil and $\Delta W$ is a gap between adjacent turns of a conductor of said coil perpendicular to a rotating direction of said rotary shaft; plural units of said coil being concentrically provided around said rotary shaft; and a relation $W' > \Delta W'$ being satisfied between the width $W'$ of the conductor of the coil positioned along the rotating direction of said rotary shaft and the gap $\Delta W'$ between adjacent turns of the conductor, wherein said coil comprises means for reducing loss in an amount of magnetic flux emerging from said coil due to an effect of perfect diamagnetism below the level at which a superconducting coil satisfying the relation $\Delta W < W$ loses magnetic flux.

2. A motor comprising:
   a rotor having a rotary shaft and a substantially disk shaped permanent magnet fixed to said rotary shaft; and
   a stator having a stator yoke and coils positioned opposite to a disk-shape face of said permanent magnet;
   wherein said coils are composed of a superconducting material and are formed in spiral shape, and satisfy a relation $\Delta W > W$ in which $W$ is the width of conductor of the coils and $\Delta W$ is the gap between adjacent turns of the conductor, wherein said coil comprises means for reducing loss in an amount of magnetic flux emerging from said coil due to an effect of perfect diamagnetism below level at which a superconducting coil satisfying the relation $\Delta W < W$ loses magnetic flux.

3. A motor comprising:
   a rotor having a rotary shaft, coils fixed to said rotary shaft and a commutator connected to said coils; and
   a stator having a stator yoke, a permanent magnet positioned opposite to said coils and brushes for current supply to said commutator;

wherein said coils are composed of a superconducting material, formed in spiral shape, and satisfy a relation $\Delta W > W$ in which W is a width of conductor of the coils and $\Delta W$ is a gap between adjacent coil turns of said conductor, wherein said coils comprise means for reducing loss in an amount of magnetic flux emerging from said coils due to an effect of perfect diamagnetism below a level at which superconducting coils satisfying the relation $\Delta W < W$ lose magnetic flux.

4. A coil of a superconducting material for use in an electrical equipment;

wherein said electrical equipment comprises a magnetic flux generating member, a rotary shaft, and a first metal sheet having a plane radially extended around said rotary shaft; and wherein said coil of superconducting material is fixed on the plane of said metal sheet and constitutes a conductor for current in cooperation with said metal sheet while maintaining a conductivity therebetween, and paths form magnetic flux are formed between adjacent coil turns of said conductor in the radial direction from said rotary shaft, wherein said first metal sheet comprises a current bypass in an event a superconducting state of said coil is locally interrupted.

5. A coil according to claim 4, wherein said coil of superconducting material is composed of a first metal and is surfacially covered with a second metal, thereby being sandwiched between said first and second metals while maintaining the conductivity therebetween.

6. A motor comprising:

a rotor having a rotary shaft, substantially cylindrical coils fixed to said rotary shaft, and a commutator connected to said coils; and a stator having a cylindrical permanent magnet positioned with a small gap to said coils and brushes for current supply to said commutator;

wherein said coils are composed of a superconducting material and are concentrically positioned on a plane extended in the radial direction of said rotary shaft, and wherein said coils comprise means for reducing deleterious effects of the Meissner effect by reducing a length of a magnetic flux by forming paths for magnetic flux between adjacent concentrically positioned turns of said coils, below a length of a magnetic flux of superconducting coils which lack paths for the magnetic flux formed between adjacent concentrically positioned turns of the coils.

7. A motor comprising:

a rotor having a rotary shaft, and a substantially cylindrical permanent magnet fixed to said rotary shaft; and a stator having substantially cylindrical coils fixed to a motor case;

wherein said coils are composed of a superconducting material and are positioned concentrically on a plane extended in the radial direction of said rotary shaft, and paths form magnetic flux from said permanent magnet are formed between adjacent turns of said concentrically positioned coils, and wherein said coils are supported by a metal member comprising a current bypass in an event a superconducting state of the coils is locally interrupted.

8. A motor according to claim 7, wherein:

said coils and metal member comprise means for maintaining conductivity between said coils and the metal member.

9. A motor comprising:

moving means having a movable member and a substantially disk-shaped permanent magnet fixed to said movable member; and a stator having a stator yoke and coils positioned opposite to a disk-shaped face of said permanent magnet;

wherein said coils are composed of a superconducting material and are formed in spiral shape, and satisfy a relation $\Delta W > W$ in which W is the width of a conductor of said coils and $\Delta W$ is a gap between conductors, wherein said coils comprise means for reducing a loss in an amount of magnetic flux emerging from said coils due to an effect of perfect diamagnetism below a level at which superconducting coils satisfying the relation $\Delta W < W$ lose magnetic flux.

* * * * *

UNITED STATES PATENT AND TRADEMARK OFFICE
CERTIFICATE OF CORRECTION

PATENT NO. : 5,099,162  
DATED : March 24, 1992  
INVENTOR(S) : TAKESHI SAWADA

It is certified that error appears in the above-identified patent and that said Letters Patent is hereby corrected as shown below:

Title page, item

[56] References Cited
FOREIGN PATENT DOCUMENTS
   Line 4, "62-27704  12/1987 Japan." should read --62-277704  12/1987.  Japan--.

COLUMN 2:
   Line 13, "current 11" should read --current. 11--; and
   Line 45, "following" should read --the following--.

COLUMN 3:
   Line 20, "FIGS. 1 to 5" should read --FIGS. 1 to 6--; an
   Line 68, "groove" should read --groove.--.

COLUMN 4:
   Line 40, "coil substrate 44A" should read --coil substra 44B--; and COLUMN 5:
   Line 21, "not shown" should read --(not shown)--;
   Line 34, "FIG. 8A and" should read --FIG. 8A,--;
   Line 38, "not shown" should read --(not shown)--; and
   Line 64, "arrow a" should read --arrow A--.

COLUMN 6:
   Line 6, "fol-" should read --the fol- --;
   Line 8, "increase" should read --increases--;
   Line 16, "increase" (first occurrence) should read --increases--; and
   Line 31, "rate" should read --rare--.

UNITED STATES PATENT AND TRADEMARK OFFICE
CERTIFICATE OF CORRECTION

PATENT NO. : 5,099,162
DATED : March 24, 1992
INVENTOR(S) : TAKESHI SAWADA

It is certified that error appears in the above-identified patent and that said Letters Patent is hereby corrected as shown below:

COLUMN 7:
    Line 39, "rooling," should read --rolling,--; and
    Line 59, "coils" should read --coils 92--.

COLUMN 8:
    Line 46, "disk" should read --disk- --;
    Line 50, "disk-shape" should read --disk-shaped--;
    Line 55, "of conductor" should read --of a conductor--; and
    Line 60, "level" should read --a level--.

COLUMN 9:
    Line 3, "of conduc-" should read --of a conduc- --; and
    Line 21, "form" should read --for--.

COLUMN 10:
    Line 16, "form" should read --for--.

Signed and Sealed this

Twentieth Day of September, 1994

Attest:

BRUCE LEHMAN

*Attesting Officer*       *Commissioner of Patents and Trademarks*